(12) United States Patent
Suh

(10) Patent No.: US 6,920,589 B2
(45) Date of Patent: Jul. 19, 2005

(54) METHOD AND APPARATUS OF RECORDING/REPRODUCING DATA USING A U-PATTERN SCAN

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 422 days.

(21) Appl. No.: 10/288,495

(22) Filed: Nov. 6, 2002

(65) Prior Publication Data

US 2003/0093745 A1 May 15, 2003

(30) Foreign Application Priority Data

Nov. 6, 2001 (KR) ........................................ 2001-69001

(51) Int. Cl.⁷ ...................... H03M 13/27; G11B 7/007
(52) U.S. Cl. ...................... 714/701; 714/762; 714/769
(58) Field of Search ................................ 714/701, 762, 714/769

(56) References Cited

U.S. PATENT DOCUMENTS 5,276,827 A * 1/1994 Delaruelle et al. .......... 711/217
5,463,640 A * 10/1995 Cloetens ...................... 714/784
5,870,366 A * 2/1999 Sako ........................ 369/59.25
6,112,324 A * 8/2000 Howe et al. ................. 714/763
6,122,764 A * 9/2000 Kobayashi ................... 714/758
6,314,542 B1 * 11/2001 Nagai et al. ................. 714/755
6,631,491 B1 * 10/2003 Shibutani et al. ........... 714/762
6,701,467 B1 * 3/2004 Victor ......................... 714/701

* cited by examiner

*Primary Examiner*—Stephen M. Baker
(74) *Attorney, Agent, or Firm*—Birch, Stewart, Kolasch & Birch, LLP

(57) ABSTRACT

The present invention relates to method and apparatus that records/reproduces data to/from an optical disk to rearrange user data such as video and/or audio data or to restore original data order by scanning each ECC block in a U-pattern. The present method arranges data in a data block in U-pattern scanning order on the block to randomize data sequence, and records the data block, of which data order has been randomized, sequentially along a track of a writable disk, whereby it is possible to recover individually a long burst error due to track-wise scratch, dust, fingerprint, or the like because an burst-error is scattered in a restored ECC block.

18 Claims, 4 Drawing Sheets

1 ECC Block POs are interleaved in

*Related Art*

Discrete U-scans

Continuous U-scans

Method and apparatus of
recording/reproducing data using
a U-pattern scan

This nonprovisional application claims priority under 35 U.S.C. §119 (a) on Patent Application No. 2001-69001 filed in Korea on Nov. 6, 2001, which is herein incorporated by reference.

BACKGROUND OF THE INVENTION

1. Field of the Invention

The present invention relates to method and apparatus that records/reproduces data to/from an optical disk to rearrange user data such as video and/or audio data or to restore original data order by scanning each ECC block in a U-pattern.

2. Description of the Related Art

An optical disk developed recently can store high-quality motion picture and/or audio data of large size, so that such a recording medium is being used widely in these days.

There are three types of an optical disk, the first is 'read-only' such as CD-ROM, the second 'write-once' such as CD-R and DVD-R, and the third 'rewritable' such as CD-RW, DVD-RAM, and DVD-RW.

When data is recorded onto such a writable optical disk, data is collected to an interleaved ECC block for the purpose of later recovery of possible errors in recording/reproducing. To construct an interleaved ECC block with input data, a 10byte-long inner parity is appended to each row of a sector (12×172) of input user data longitudinally as shown in FIG. 1, and a 16 byte-long outer parity is appended vertically to each column of a collected 16 sectors and inner parities to make a complete ECC block.

Afterwards, 16 rows of the outer parity block are interleaved into 16 sectors to prevent possible burst error in an outer parity block that may be caused from scratch, dust, fingerprint, or the like.

The 182 byte-long rows of the complete interleaved ECC block are sequentially retrieved from the first to the 280-th row, as shown in FIG. 2. Data contained each retrieved row is converted by, e.g., 8/16 modulation and then recorded along a spiral track of a writable optical disk.

In reproducing, the respective inverse processes associated with procedures of FIGS. 1 and 2 are conducted to recover original input user data.

In case that an ECC block with an interleaved outer parities is sequentially read row by row and then recorded as aforementioned, if a long burst error was caused by scratch, dust, fingerprint, defect, or the like along a spiral track as shown in FIG. 3, error correction thereof could be failed because error can be corrected based on correlation among neighboring data.

Moreover, a high-density digital versatile disk (called 'HD-DVD') developed lately is likely to have more frequent fails in error correction due to a long burst error caused from a track-wise scratch, dust, fingerprint, defect, or the like because it has a track of higher density.

SUMMARY OF THE INVENTION

It is an object of the present invention to provide a disk recording/reproducing method and apparatus using a U-pattern scan that records a sequence-randomized ECC block along a track of a recording medium after randomizing data sequence by scanning each ECC block in a U-pattern, and conducts an error-correcting operation for each ECC block after restoring normal data sequence through an inverse U-pattern scan.

Method and apparatus of recording data on a writable disk using a U-pattern scan in accordance with the present invention is characterized in that it arranges data in a data block in U-pattern scanning order on the block to randomize data sequence, and records the data block, of which data order has been randomized, sequentially along a track of a writable disk.

Method and apparatus of reproducing data from a writable disk using an inverse U-pattern scan in accordance with the present invention is characterized in that it constructs a data block with data read from a recording medium, conducts an inverse operation of a U-pattern scan that was used in recording in order to restore original data order in the data block, error-corrects the data block of original data order, and outputs data in the data block sequentially.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, a preferred embodiment thereof will now be described with reference to the accompanying drawings.

Figure 1:
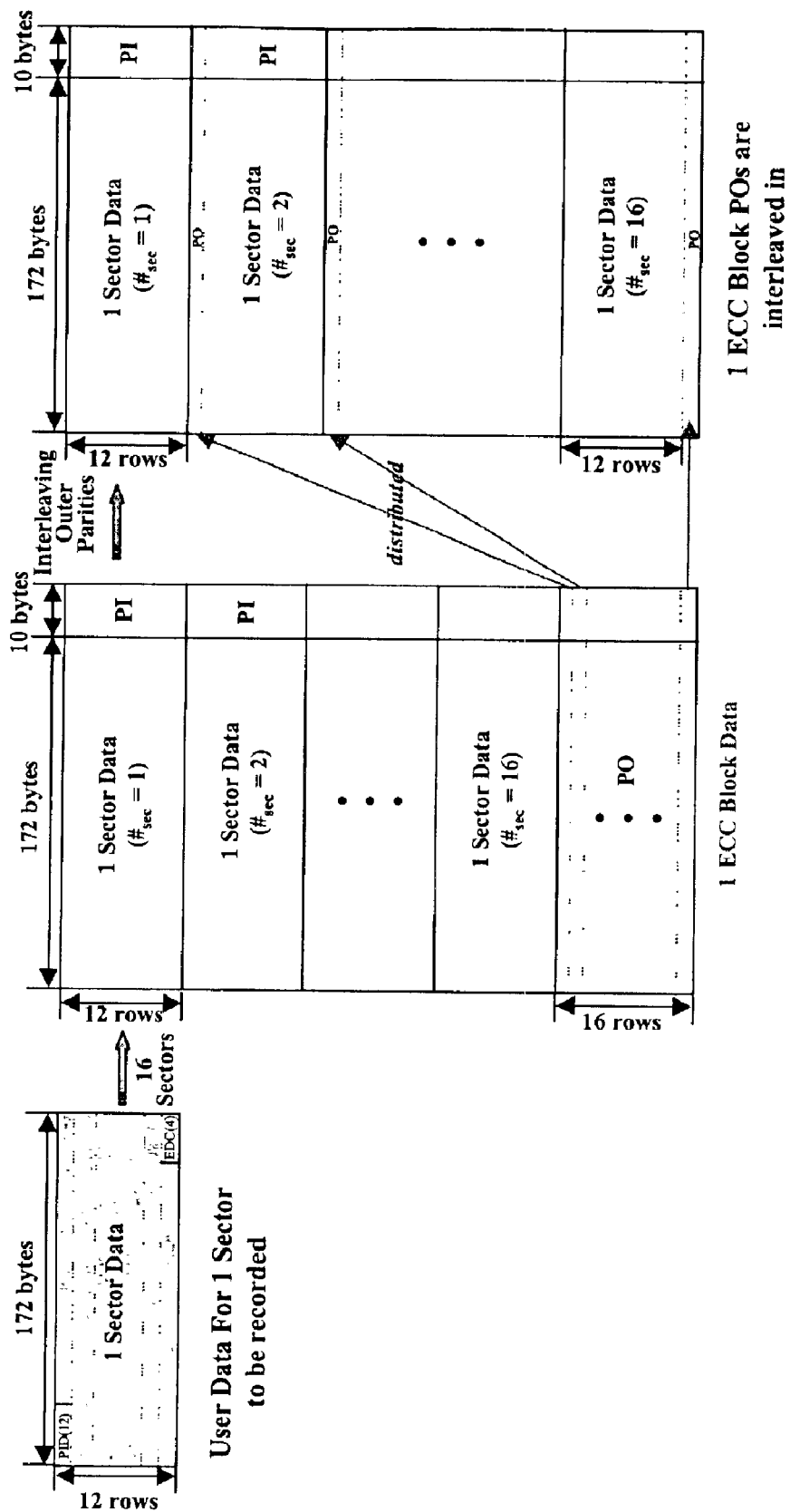
FIG. 1 shows a schematic procedure to construct an ECC block with input data.
Figure 2:
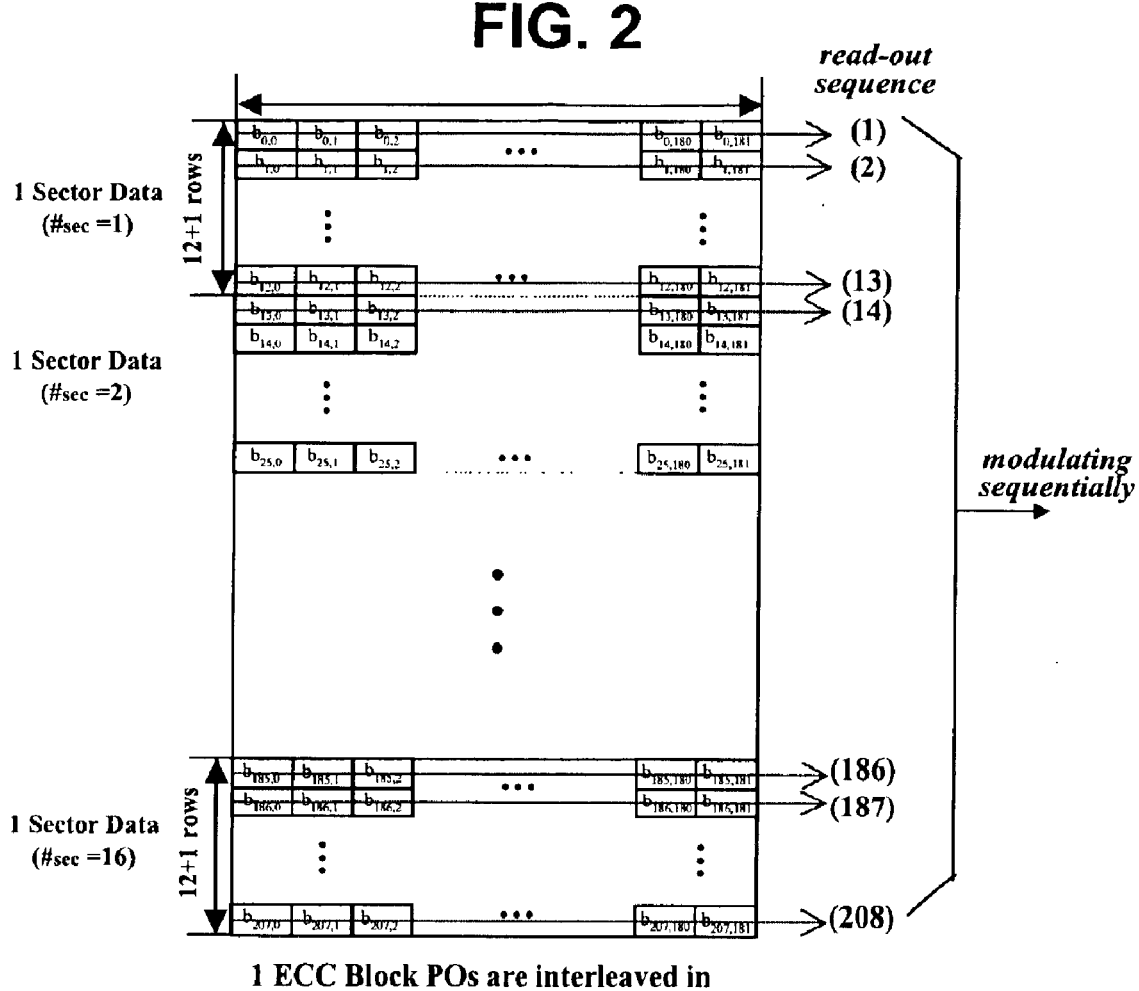
FIG. 2 shows a data read sequence from an ECC block to modulate data in the ECC block.
Figure 3:
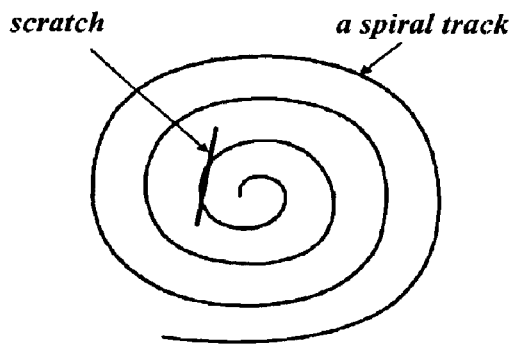
FIG. 3 shows a scratch created along a track on an optical disk.
Figure 4:
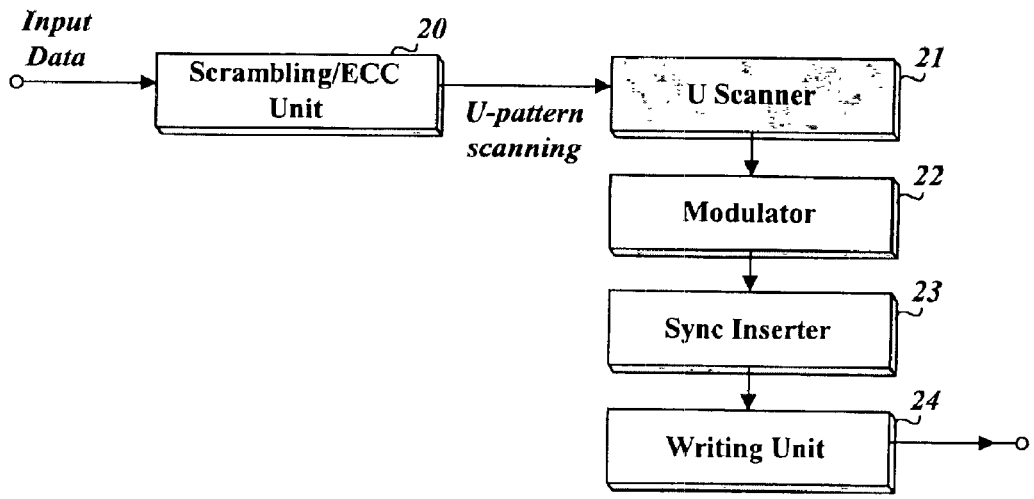
FIG. 4 is a simplified block diagram of a disk recording device using a U-pattern scan in accordance with the present invention.

FIG. 4 is a simplified block diagram of a disk recording device using a U-pattern scanning in accordance with the present invention. The recording device of FIG. 4 includes a scrambling/ECC unit 20 scrambling input data and making an ECC block by collecting the scrambled data and appending inner and outer parities to each row and column; a U scanner 21 scanning each made ECC block in an inclined 'U' pattern and outputting data from the ECC block in scanned order; a modulator 22 conducting EFM+ modulation for each data outputted from the U scanner 21; a sync inserter 23 packing the modulated data in each physical sector unit while inserting sync data at every adequate position; and a writing unit 24 writing the constructed physical sector unit sequentially along a track of a writable disk.

Especially, the U scanner 21 randomizes data order in each ECC block to disperse neighboring data along the track. This U-pattern scanning algorithm is illustratively explained in detail below.

Figure 5:
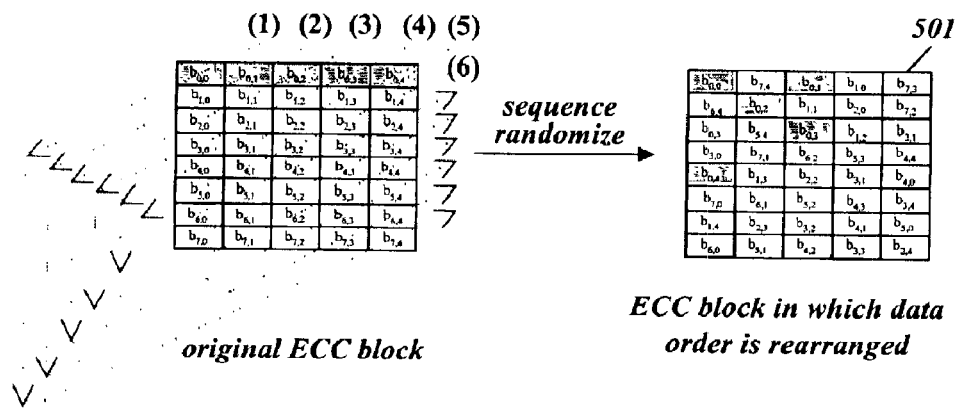
FIGS. 5 and 6 illustrate the first and the second embodiment, respectively, of randomizing data order by a U-pattern scanning in accordance with the present invention.

FIG. 5 illustrates the first embodiment of randomizing data order by a U-pattern scanning in accordance with the present invention. For the convenience of explanation, it is assumed that an ECC block, which is 208×182 in actual size, is in 8×5 size from now on.

The U scanner 21 starts to scan an 8×5 ECC block (b(0,0)~b(7,4)) stored in a buffer of the scrambling/ECC unit 20 in an inclined U-pattern from b(0,0). Then, it continues to conduct a discrete inclined-U scan for the ECC block in order of b(0,1), b(0,2), . . . that are respective scanning start points.

According to the discrete inclined U-pattern scans, b(0,0) and b(7,4) are scanned sequentially at the first U scan, b(0,1), b(1,0) b(7,3) and b(6,4) at the second, b(0,2), b(1,1), b(2,0), b(7,2), b(6,3), and b(5,4) at the third, b(0,3), b(1,2), b(2,1), b(3,0), b(7,1), b(6,2), b(5,3), and b(4,4) at the fourth, b(0,4), b(1,3), b(2,2), b(3,1), b(4,0), b(7,0), b(6,1), b(5,2), b(4,3), and b(3,4) at the fifth, and b(1,4), b(2,3), b(3,2), b(4,1), b(5,0), b(6,0), b(5,1), b(4,2), b(3,3), and b(1,4) at the last. The block 501 of FIG. 5 is a collection of rearranged data by the above U-scanning. If the rearranged ECC block is outputted from the first row, neighboring data, e.g., 5 bytes of b(0,0)~b(0,4) are dispersed along a track to the first, the third, the 7th, the 13th, and the 21st position, respectively.

Figure 6:
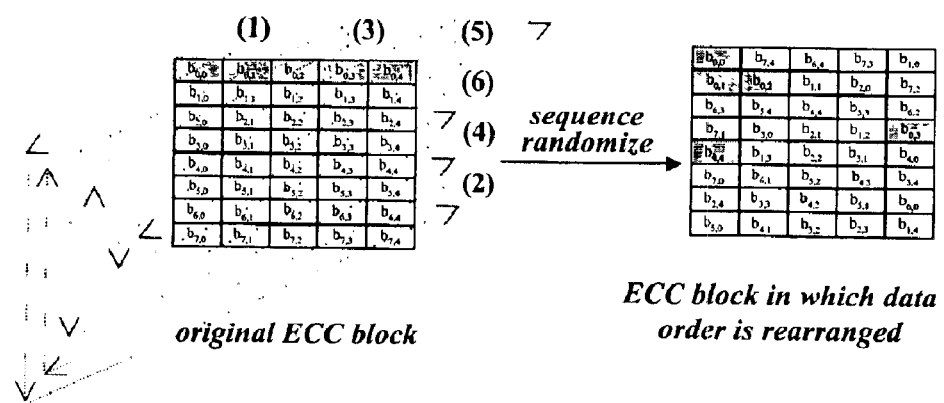

FIG. 6 illustrates the second embodiment of randomizing data order by a U-pattern scanning in accordance with the present invention.

The scanning algorithm of FIG. 6 is a continuous manner. In this scanning algorithm, a next scanning starts from a byte adjacent to an end byte of the previous scanning. That is, the first U-scanning starts from b(0,0) the same as the first embodiment, however, the second U-scanning starts from b(6,4) that is just adjacent to b(7,4) at which the first scanning ends. In the same manner, the third scanning starts from b(0,2).

According to the continuous inclined U-pattern scan, b(0,0) and b(7,4) are scanned sequentially at the first U scan, b(6,4), b(7,3), b(1,0), and b(0,1) at the second, b(0,2), b(1,1), b(2,0), b(7,2), b(6,3), and b(5,4) at the third, b(4,4), b(3,3), b(6,2), b(3,0), b(7,1), b(3,0), b(2,1), b(1,2), and b(0,3) at the fourth, b(0,4), b(1,3), b(2,2), b(3,1), b(4,0), b(7,0), b(6,1), b(5,2), b(4,3), and b(3,4) at the fifth, and b(2,4), b(3,3), b(4,2), b(5,1), b(6,0), b(5,0), b(4,1), b(3,2), b(2,3), and b(1,4) at the last.

The writing unit 24 records data inputted through the modulator 22 and the sync inserter 23 from the U scanner 21 onto a writable disk in scanning order of the U scanner 21. Consequently, data order in an original ECC block is almost randomized by the U-pattern scan during data record.

Method and apparatus of reproducing data of a writable disk recorded as above are explained below.

Figure 7:
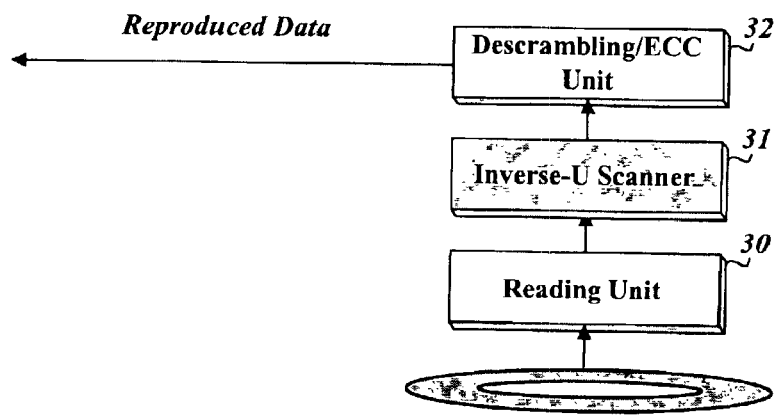
FIG. 7 is a simplified block diagram of a disk reproducing device using an inverse U-pattern scanning in accordance with the present invention.

FIG. 7 is a simplified block diagram of a disk reproducing device using an inverse U-pattern scan in accordance with the present invention.

The device of FIG. 7 includes a reading unit 30 reading and demodulating data recorded on an optical disk; an inverse-U scanner 31 constructing an ECC block from the demodulated data and then conducting an inverse-U scan for the constructed ECC block to restore original data sequence of the ECC block; and a descrambling/ECC unit 32 conducting a conventional error-correcting operation of the ECC block of original order and then descrambling the data in the error-corrected ECC block.

Figure 8:
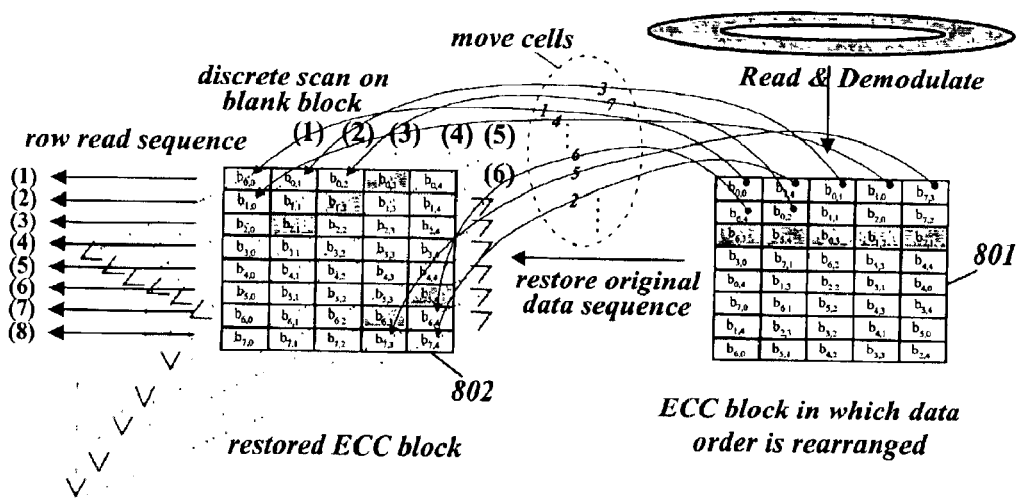
FIG. 8 shows a schematic data reproducing procedure using an inverse-U scan.

The inverse-U scanner 31 packs data demodulated and read from an optical disk in an ECC-formed block and conducts an inverse-U scanning operation to restore ECC block of original data order, as illustrated in FIG. 8.

For the inverse U-scanning operation, the inverse-U scanner 31 prepares a blank block that is structured the same as the ECC-formed block 801 including data in almost-randomized order, and then, it conducts discrete or continuous inclined U-pattern scan, which was conducted in recording mode, on the blank block. While scanning the blank block, it reads bytes sequentially one by one from the ECC-formed block and moves them into blank cells of the blank block in scanned order.

For example, in case that a discrete U-pattern scan was used as the first embodiment, cells b(0,0) and b(7,4) of the blank block are filled at the first U-pattern scanning, b(0,1), b(1,0), b(7,3), and b(6,4) at the second, b(0,2), b(1,1), b(2,0), b(7,2), b(6,3), and b(5,4) at the third, b(0,3), b(1,2), b(2,1), b(3,0), b(7,1), b(6,2), b(5,3), and b(4,4) at the fourth, b(0,4), b(1,3), b(2,2), b(3,1), b(4,0), b(7,0), b(6,1), b(5,2), b(4,3), and b(3,4) at the fifth, and b(1,4), b(2,3), b(3,2), b(4,1), b(5,0), b(6,0), b(5,1), b(4,2), b(3,3), and b(1,4) at the last. Consequently, an ECC block of original data order 802 is made from the ECC-formed block 801 in almost-randomized order.

If the second U-scanning algorithm, namely, the continuous U-scanning method of FIG. 6 is used to randomize data order in recording mode, the read data is sequentially moved one by one into respective blank cells of the prepared blank block in continuously-scanned order on the blank block.

In case that the above-explained U-pattern and inverse U-pattern scanning are applied to data recording/reproducing, even though a contiguous data group, e.g., the third row (shaded) in the read block 801 was broken by a long burst error caused from a track-wise scratch, dust, fingerprint, or the like as illustrated in FIG. 8, the concerned bytes in the broken data group would be dispersed here and there in the ECC block 802 of normal data order restored by the inverse U-pattern scanning. Therefore, an error correcting operation is able to correct the dispersed error cells obtained from the broken third row individually because correction is based on neighboring data.

The above-explained disk recording/reproducing method and apparatus using a U-scanning manner can recover individually a long burst error due to track-wise scratch, dust, fingerprint, or the like. Especially, the present invention can give a better error-correction effect to a higher-density disk recording medium that is weaker to a track-wise damage.

The detailed description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of recording data on a writable disk using a U-pattern scanning, comprising the steps of:
    (a) arranging data in a data block in U-pattern scanning order on the block to randomize data sequence; and
    (b) recording the data block, of which data order has been randomized, sequentially along a track of a writable disk.

2. The method of claim 1, wherein the data block is a unit of ECC block.

3. The method of claim 2, wherein said step (a) conducts a U-pattern scanning several times discretely on an ECC block in order to arrange data at random.

4. The method of claim 2, wherein said step (a) conducts a U-pattern scanning several times continuously on an ECC block in order to arrange data at random.

5. An apparatus of recording data on a writable disk using a U-pattern scanning, comprising:

a data organizing unit constructing a data block with input data;

a scanning unit arranging data in a data block in U-pattern scanning order on the data block to randomize data sequence;

a modulating unit modulating sequentially data in the data block, of which data order has been randomized; and a writing unit writing the modulated data sequentially along a track of a writable disk.

6. The apparatus of claim 5, wherein the data block is a unit of ECC block.

7. The apparatus of claim 6, wherein said scanning unit conducts a U-pattern scanning several times discretely on an ECC block in order to arrange data at random.

8. The apparatus of claim 6, wherein said scanning unit conducts a U-pattern scanning several times continuously on an ECC block in order to arrange data at random.

9. A method of reproducing data from a writable disk using an inverse U-pattern scanning, comprising the steps of:

(a) constructing a data block with data read from a recording medium and conducting an inverse operation of a U-pattern scan that was used in recording in order to restore original data order in the data block; and (b) error-correcting the data block of original data order and outputting data in the data block sequentially.

10. The method of claim 9, wherein the data block is a unit of ECC block.

11. The method of claim 9, wherein the inverse operation of a U-pattern scan prepares a blank block, and moves bytes one by one sequentially from the data block into respective blank cells of the blank block in U-pattern scanning order on the blank block.

12. The method of claim 11, wherein the U-pattern scanning is conducted on the blank block discretely several times.

13. The method of claim 11, wherein the U-pattern scanning is conducted on the blank block continuously several times.

14. An apparatus of reproducing data from a writable disk using an inverse U-pattern scanning, comprising:

a reading unit reading data from a recording medium;

an inverse scanning unit constructing a data block with data read from a recording medium and conducting an inverse operation of a U-pattern scan that was used in recording in order to restore original data order in the data block; and an error-correcting unit error-correcting the data block of original data order and outputting data in the data block sequentially.

15. The apparatus of claim 14, wherein the data block is a unit of ECC block.

16. The apparatus of claim 14, wherein the inverse operation of a U-pattern scan prepares a blank block, and moves bytes one by one sequentially from the data block into respective blank cells of the blank block in U-pattern scanning order on the blank block.

17. The apparatus of claim 16, wherein the U-pattern scanning is conducted on the blank block discretely several times.

18. The apparatus of claim 16, wherein the U-pattern scanning is conducted on the blank block continuously several times.

* * * * *